(12) United States Patent
Bertolli et al.

(10) Patent No.: US 12,737,998 B2
(45) **Date of Patent: *Sep. 15, 2026**

(54) PROCESS FOR THE ALIGNMENT OF VIRTUAL CONTENT IN PHYSICAL ENVIRONMENTS

(71) Applicant: Raventide Partners LLC, Denver, CO (US)

(72) Inventors: Michael Bertolli, Knoxville, TN (US); Alicia Caputo, Knoxville, TN (US); Jason Therrien, Houston, TX (US)

(73) Assignee: Raventide Partners LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,039

(22) Filed: Dec. 5, 2024

(65) Prior Publication Data

US 2025/0095310 A1 Mar. 20, 2025

Related U.S. Application Data

(63) Continuation-in-part of application No. 18/602,938, filed on Mar. 12, 2024, now Pat. No. 12,190,464.

(60) Provisional application No. 63/489,854, filed on Mar. 13, 2023.

(51) Int. Cl.
*G06T 19/00* (2011.01)
*G06F 3/0346* (2013.01)

(52) U.S. Cl.
CPC .......... *G06T 19/006* (2013.01); *G06F 3/0346* (2013.01); *G06T 2210/21* (2013.01)

(58) Field of Classification Search
CPC .............................. G06T 19/006; G06T 19/20
See application file for complete search history.

(56) References Cited

U.S. PATENT DOCUMENTS

| | | | | |
|---|---|---|---|---|
| 2017/0365102 | A1* | 12/2017 | Huston | A63F 13/65 |
| 2019/0051054 | A1* | 2/2019 | Jovanovic | G06F 3/04815 |
| 2021/0027539 | A1* | 1/2021 | Huang | G06T 7/194 |

* cited by examiner

*Primary Examiner* — Charles Tseng
(74) *Attorney, Agent, or Firm* — Chambliss, Bahner & Stophel, P.C.; Stephen D. Adams

(57) ABSTRACT

Methods for aligning an extended reality (XR) environment with a physical environment such that a physical position and movement of a physical entity within the physical environment is identically aligned and identically mirrored by a corresponding XR position and corresponding movement of an XR entity within the XR environment. The alignment process assigns a position to the XR environment with respect to the physical environment such that certain elements of one environment are defined as being co-planar with certain surfaces of the other environment. Next, two planes or two lines in one environment intersect to define a first intersection. A second intersection in the other environment is located at the intersection of the first environment to align the two environments.

28 Claims, 6 Drawing Sheets

PROCESS FOR THE ALIGNMENT OF VIRTUAL CONTENT IN PHYSICAL ENVIRONMENTS

CROSS-REFERENCE TO RELATED APPLICATIONS

This application is a continuation-in-part of Ser. No. 18/602,938, filed Mar. 12, 2024, and titled PROCESS FOR THE ALIGNMENT OF VIRTUAL CONTENT IN PHYSICAL ENVIRONMENTS, which claims the benefit of U.S. Provisional Application No. 63/489,854, filed Mar. 13, 2023, and titled HIGH-ACCURACY ADVANCED ALIGNMENT OF VIRTUAL CONTENT IN PHYSICAL ENVIRONMENTS; the content of each of the foregoing applications is incorporated herein by reference in their entirety.

FIELD

This invention relates generally to systems and methods for aligning and tracking physical objects in virtual reality environments, augmented reality environments, mixed reality, and extended reality environments for one or more users across multiple coordinate systems.

BACKGROUND

Virtual reality (VR), augmented reality (AR), mixed reality (MR), and extended reality (XR) systems (collectively and individually, each an "XR" system unless specifically expressed otherwise), as further defined below, are helpful in providing realistic training, entertainment, and other experiences. In these systems, it is often necessary or desired to align real-world objects, structures, environments with computer-generated objects, structures, environments. Accurate alignment is often a necessary or desired component of XR systems for several reasons, including for safety (e.g., alerting a user when they are about to collide with a wall or piece of furniture). In addition to safety, correctly aligning the physical and virtual environments allows a user to correctly and accurately interact with the XR content. This alignment allows, for example, a computer-generated vase or candlestick to be accurately and correctly placed onto a real-world table in an XR environment. In another example, proper alignment allows a user to walk through a XR door that is created in a real-world warehouse. In another example, when properly aligned, a virtual "corner" of a building is in the same position and orientation as the corresponding physical corner in the real world. In yet another example, proper alignment allows two users to accurately and correctly orient themselves within a computer-generated environment and for one user's position within that environment to be correctly rendered for the other user. As such, XR systems often employ a knowledge of a user's physical surroundings to provide immersive interactions with virtual content, including by aligning the virtual structures with corresponding physical structures.

Conventionally, alignment of virtual content in physical spaces is difficult and fraught with uncertainty (e.g., misalignment). According to certain current methods, a user "tags" one or more alignment anchors within an XR system using an XR peripheral (e.g., a controller) or a visual/physical anchor located within a space (e.g., a QR code) using an imaging device (e.g., a smartphone camera). In this process, a number of errors are common, including user error, systematic errors, and statistical errors. Due to the presence of these errors, highly accurate alignment is often nearly impossible. Furthermore, over large distances, these errors and misalignments are magnified, which results in a truly difficult process for accurately aligning large-scale (e.g., building-sized) XR content in physical environments. Additionally, multiplayer alignment, where devices must align to the same physical space across varying device-specific coordinate systems, have compounded errors (i.e., each device's anchoring contributes more uncertainty to the alignment) and profound end-user issues (e.g., two players looking at different physical locations for virtual content that should be in the same physical place).

In general, the process of using "fiducial markers" for the alignment of physical objects or locations with XR objects or locations (i.e., objects or locations that are used as a point of reference or a measure, such as to provide the alignment of XR content to a physical space) often uses one or more methods such as visual odometry/computer vision (e.g., QR codes) or spatial anchors tagged by the user (e.g., using the controller) where the location of such anchors is derived from the system's spatial localization algorithm (e.g., from "Simultaneous Localization and Mapping" or "SLAM", which uses a combination of sensors and accelerometers). Current methods leverage statistical methods to reduce or mitigate uncertainty (i.e., "statistical mitigation"), such as averaging over multiple QR codes, or applying Kalman Filters to sensor readings.

However, current fiducial approaches have systematic uncertainty that, in practice, would be very difficult to overcome by statistics (i.e., an infinite number of samples will not provide infinitesimal uncertainty). This is compounded by coordination of alignments across multiple devices, where each device may have variations in both systematic and statistical uncertainty from each other. Even in the best-case scenario where no statistical uncertainty is present (e.g., the sample is exactly equal to population), devices will still have systematic uncertainty resulting from the hardware and/or software intrinsics of the device (e.g., systematic uncertainty resulting from the SLAM algorithm as well as from each of the related sensors and their system for collection). Additionally, uncertainty introduced by the user, in practice, cannot be easily eliminated using current methods (e.g., angle of viewing a QR code, accuracy of tagging a specific location), introducing another source of both systematic and statistical uncertainty.

Importantly, these conventional methods are, in general, used only over small distances (e.g., room scale, 10'×10', or views of larger scales from a distance such as viewing construction in a stationary location). It should be noted that, at large distances, especially large distances with up-close viewing (e.g., aligning an entire building at one room and applications where users will traverse the entire building), not only are uncertainties more impactful, but systematic uncertainties can dominate over statistical uncertainties, rendering statistical mitigation useless.

Finally, in some situations, a system's coordinate system might not be absolute. For example, in the case of certain SLAM-based systems, sensor fusion can occur that tracks the location of the system in an entirely self-referential manner. In such cases, the system knows where it is locally, but has no reference for where it is with respect to other systems. Not only is this coordinate system completely local, it is often determined on the startup of the system. For example, two different XR headsets using SLAM can be turned on in the same space (e.g., two different users located mere feet apart) and have completely different coordinate systems. This can create coordination and pairing issues when multiple XR peripherals are in use. When pairing multiple systems, it would be preferable to provide a means for ensuring that each piece of hardware references a common coordinate system and to generate some common "truth" between them.

The currently-disclosed systems and methods described below seek to address at least some of the problems described above that impact XR systems, environments, and methods of use.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

A virtual reality ("VR") environment is one that provides total immersion of the user without introducing elements of the user's actual environment. Any interactions occur entirely within the virtual environment and not within the physical world. Typically, a VR environment is created using computer-generated or real images. Peripherals, such as gloves, goggles, controllers, etc. (i.e., "peripherals"), detect the user's movements, typically including movement of the user's head and hands, translate that movement into the virtual environment to allow the user to interact with the VR environment. On the other hand, an AR environment is one where data (e.g., computer-generated experiences, information, etc.) are overlaid onto the physical world, but where all interactions occur within the physical world. Typically, AR environments use a display screen, glasses, goggles, etc. to present the data. A mixed reality ("MR") environment is essentially a combination of VR and AR environments, where virtual objects are integrated and interact with the physical world in real time. Like VR, XR peripherals may also be used in connection with XR environments, which devices are typically specifically manufactured for direct connectivity and interaction with the environment created. Finally, an extended reality ("XR") is used as an umbrella or catchall term that includes AR, VR, MR. In the description that follows, the term "XR" or the phrase "extended reality" may be used to refer to any of AR, VR, or XR unless otherwise specifically noted.

The term "XR system" refers to the computer, machine, etc. that generates the virtual content or experience for an XR environment. Additionally, the term "peripheral" or "XR peripheral" is used to refer to the tools (e.g., gloves, goggles, helmets, etc.) that a user might employ to view and interact with that XR environment.

The term "position" means both a location in space as well as an orientation in space. A first position might differ from a second position where the location in space is the same if the orientation in space differs. For example, if an entity is located at XYZ-coordinates (0,0,0) and is oriented "north," that entity is in a different "position" if it turns "south" while at those same coordinates. Similarly, a first position might differ from a second position where the orientation in space is the same if the location in space differs. For example, if an entity is located at XYZ-coordinates (0,0,0) and is oriented "north," that entity is in a different "position" if it continues to face "north" but moves to XYZ-coordinates (1,1,1). The term, "tracked information" refers to one or more of information related to location, orientation, or movement of an entity or an I/O component.

The term "entity" can mean a person, an object, structure, etc.

As discussed above, the present invention relates to systems and methods involving combinations and interactions of real structures and environments with computer-generated, virtual, or XR content. It should be appreciated, therefore, that virtual content does not actually interact (e.g., contact, intersect, abut, etc.) with real world or physical content. However, in this disclosure, the use of terms such as "interact", "intersect", "correspond", etc., when referencing interactions between XR content and real-world environments and content, means that they are defined as occupying a position, orientation, etc. in space that, if both were real, would actually interact, intersect, correspond, etc. For example, a virtual plane "intersects" a real wall when, if the virtual plane were real, it would actually intersect the real wall. Likewise, a virtual point of interest is located at a position that "corresponds" to a location on a real wall when, if the virtual point of interest were real, it would actually be located at that location on the real wall. While, in many cases, an entity "corresponds" to another entity when they are the exact same thing. For example, a virtual chair corresponds to an identical physical chair. However, in other cases, the nature or type of entities might differ while still corresponding to one another. For example, a virtual chair (e.g., leather chair) corresponds to a different type of physical chair (e.g., upholstered fabric chair). In other cases, the nature of the entities differ while they still "correspond" to one another. For example, a physical staircase might correspond to a virtual entrance ramp to a spaceship. At a minimum, to "correspond" to one another, the physical locations of two entities are considered the same. For example, a virtual entity is located (or is assigned a location) that is the same as the location of a corresponding physical entity. More preferably, the orientation of the two corresponding entities is the same, but that is not always the case. For example, a stationary physical wardrobe might correspond to a virtual enemy that is permitted to rotate in virtual space but without moving its location. Even more preferably, the function and characteristics of two corresponding entities are the same or similar. For example, an entity corresponding to a physical chair preferably provides a place for a user to sit (e.g., a virtual stool). In another example, a physical entity corresponding to a virtual staircase preferably provides the user the ability to walk up and down between two physical heights (e.g., a physical ramp).

SUMMARY

The above and other needs are met by a method for delivering extended reality (XR) content. In the disclosed method, a physical environment having a physical entity, a first physical surface and a second physical surface is provided. Next, a first projected surface that is co-planar with the first physical surface and a second projected surface that is co-planar the second physical surface is also provided. The first projected surface intersects with the second projected surface along a first elongate intersection. Lastly, an XR system is also provided. The XR system includes an XR content generation system (XGS) for generating XR content and input-output (I/O) components including an input device for receiving inputs for interacting with the XR content and an output device for outputting XR content including at least visual XR content. With the XGS, a three-dimensional XR environment is generated. The XR environment has an XR entity that corresponds to the physical entity, a first XR surface, a second XR surface, and a XR intersecting plane. The XR environment may be traversed by receiving the inputs via the input device.

The XR environment is aligned with the physical environment such that a physical position, including a location and an orientation in three-dimensional physical space, and movement of the physical entity within the physical environment is identically aligned and identically mirrored by a corresponding XR position, including a location and an orientation in three-dimensional XR space, and corresponding movement of the XR entity within the XR environment. The alignment process includes assigning a position, including a location and orientation, to the XR environment with respect to the physical environment. As a result of that assignment, the first XR surface is co-planar with the first physical surface, the second XR surface is co-planar with the second physical surface, and the XR intersecting plane intersects with the first XR surface along a fourth elongate intersection and intersects with the second XR surface along a fifth elongate intersection. Finally, an intersection point is located at an intersection of the fourth elongate intersection with the fifth intersection, such that the intersection point is disposed along the first elongate intersection.

In an alternative embodiment, the present disclosure provides an alignment method for extended reality (XR) content. The method includes the step of providing a first environment and a second environment, each having a first surface and a second surface. In each of the first environment and the second environment, n intersection point is defined. At least one of the intersection points is defined by providing a first line A that is coplanar with the first surface and a second line B that is coplanar with the second surface, providing an intersecting plane that intersects the first surface and the second surface, and then projecting line A onto the intersecting plane to provide projected line segment AP and projecting line B onto the intersecting plane to provide projected line segment BP. Line segment AP and line segment BP are sized and configured to intersect with one another at the at least one intersection point. Finally, a position of the first environment is aligned with a position of the second environment via an alignment process comprising aligning the intersection points. One environment of the first environment and the second environment is a XR environment comprising XR content generated by an XR content generation system (XGS) and the other environment of the first environment or the second environment is a physical environment.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

The following description provides non-limiting exemplary implementations of the methods of the present invention. These methods may be used for identifying three-dimensional positions in space in order to align physical and virtual spaces or objects with one another. Many of the cases described below illustrate these concepts using architectural or floorplan drawings. In those cases, other users or objects may be aligned using portions of the building, etc. as reference points. However, the methods of the present invention may be used much more broadly, including any time XR content and physical environments, users, objects, etc. are to be aligned with one another, and should not be understood as being limited to alignment using buildings, floorplans, etc.

Figures 1, 2, 3:
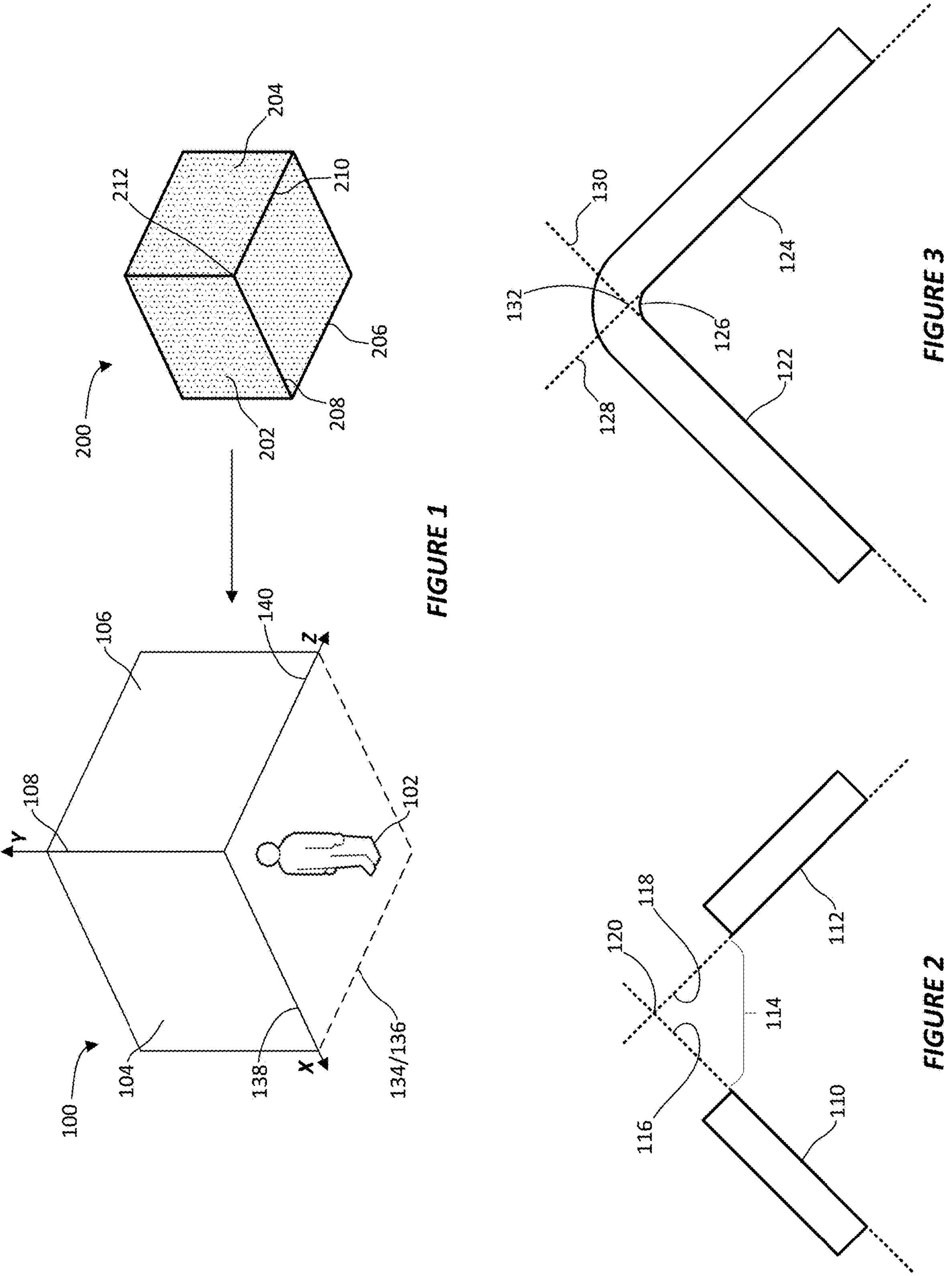
FIG. 1 depicts a physical environment and an XR model that are intended to be aligned using a method of the present invention.
FIG. 2 depicts an example corner of a physical environment formed by two non-intersecting walls and projected surfaces forming a projected intersection.
FIG. 3 depicts an example corner of a physical environment formed by a continuously curved wall and projected surfaces forming a projected intersection.

Now, with initial reference to FIG. 1, in a hypothetical physical environment 100 having a first physical surface 104 and a second physical surface 106 is intended to be aligned by a user 102 with a computer-generated XR environment or model 200 having a first virtual surface 202, a second virtual surface 204, and a virtual intersecting plane 206. The methods disclosed below provide a means for making this alignment in a much more accurate fashion compared to conventional alignment methods. In particular, in aligning physical environment 100 with model 200, the presently described methods use a minimal number of points defined in a physical space to provide a unique position and orientation without reliance on uncertain user input, statistical algorithms (e.g., SLAM) or other spatial positioning, visual odometry or computer vision, or large arrays of sensors. These points act as robust fiducials (i.e., a fixed basis or point of comparison) to provide mathematics that is both necessary and sufficient for deriving alignment with closed-form, analytical solutions that minimize uncertainty. Certain methods described herein require two points on each of two surfaces, such that there exists two intersecting planes, each of which contains one of the sets of two points. These four points in space can be chosen by any method, including current tagging/anchoring methodologies (e.g., QR codes, visual tracking, controller position). However, preferably, extremely simple methods (e.g., time-of-flight, depth sensing, positional sensing) can be used to identify the points, thereby minimizing the sensors and algorithms necessary for tagging, positioning, or identifying the location of these points.

Now, in certain embodiments, the first physical surface 104 and the second physical surface 106 intersect with one another along a first elongate intersection 108. In the illustrated case, the first physical surface 104 and the second physical surface 106 are each physical walls that intersect with one another at an intersection (e.g., corner 108). Accordingly, in this example, the first physical surface 104 is defined as being positioned to the left of the corner 106 (as seen in FIG. 1) and the second physical surface 106 is defined as being positioned to the right of the corner.

In certain cases, however, the physical surfaces of the physical environment 100 may not clearly, physically intersect one another at an intersection 108 as in the case discussed above. This might be the case, for example, as depicted in FIG. 2, with a pair of non-intersecting angled wall segments, including first wall segment 110 and second wall segment 112 that provide an opening 114 between them for a door, window, etc. In such cases, each of the wall segments 110, 112 can be projected to provide projected surfaces (i.e., planes), which may be a projected surface, that are each co-planar with the inner surface of one the wall segments and that intersect with one another. In particular, a first projected surface 116 is provided and is co-planar with the inner surface of first wall segment and a second projected surface 118 is provided and is co-planar with the inner surface of second wall segment. While first wall segment 108 and second wall segment 110 do not intersect, the first projected surface 114 and second projected surface 116 intersect at projected intersection 120, which is not located on or within either wall segment 108, 110.

In other cases, intersecting walls may still not provide a clear "intersection" between them. For example, as shown in FIG. 3, a continuous wall providing a first wall segment 122 that is joined continuously with a second wall segment 124 by a curved intersection 126 does not provide a clear intersection between them. As before, in such cases, each of the wall segments 122, 124 can be projected to provide projected surfaces that are each co-planar with the inner surface of one the wall segments and that intersect with one another. In particular, first wall segment 122 is projected to provide first projected surface 128 that is co-planar with the inner surface of first wall segment and second wall segment 124 is projected to provide second projected surface 130 that is co-planar with the inner surface of second wall segment. While first wall segment 122 and second wall segment 124 do not clearly intersect, the first projected surface 128 and second projected surface 130 intersect at projected intersection 132, which is located within the continuous wall.

In the cases illustrated above, the projected surfaces are co-planar with the inner surface of the relevant wall segments because the relevant intersection point of the selected "corner" is an inside corner. In other cases, the projected surfaces may be placed in other positions, including at other depths, with respect to the wall or wall segments. For example, if the selected "corner" is an outside corner, the projected surfaces would be co-planar with an outer surface of the relevant wall segments.

Figure 4:
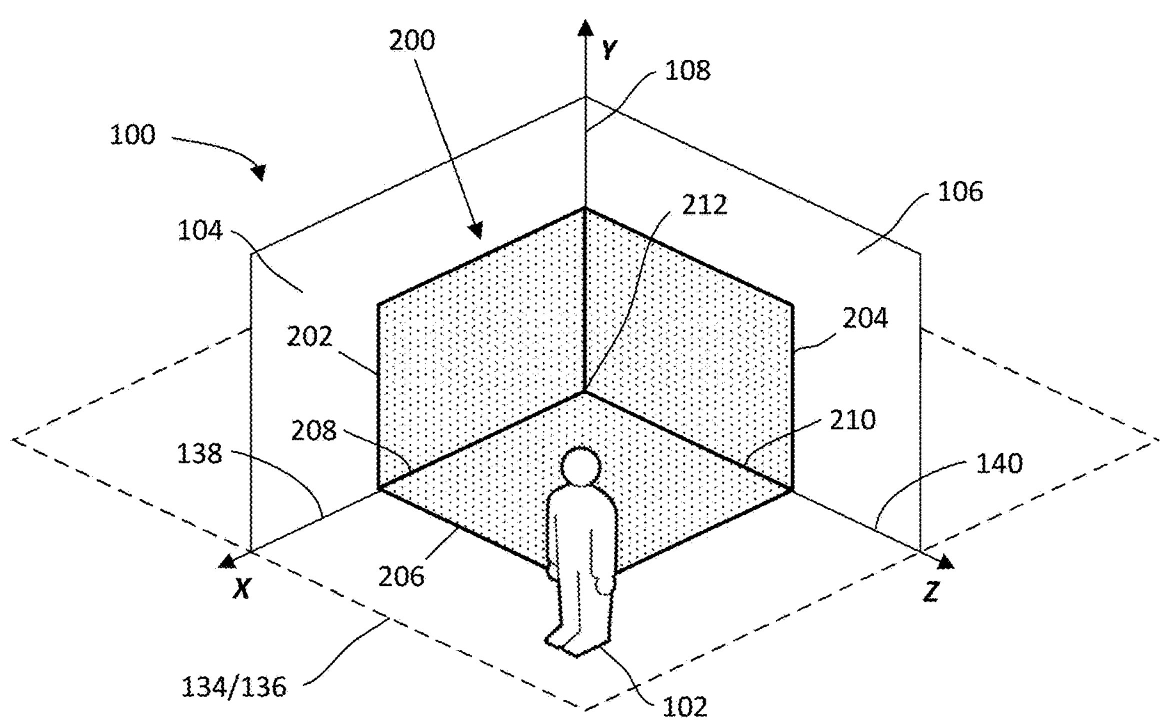
FIG. 4 depicts a physical environment that has been aligned with XR model according to a method of the present invention.

Next, returning to FIG. 1 and with reference to FIG. 4, while not necessary in every embodiment of the present invention, in certain embodiments, the method further includes providing a physical environment 100 having selected intersecting plane 134. This selected intersecting plane 134 is used in aligning the physical environment 100 and the model 200 at a specific and selected vertical position relative to one another. In this embodiment, an arbitrary Cartesian coordinate system is provided, which coordinate system includes an X-axis, Y-axis, and Z-axis, where the Y-axis is aligned to the "vertical" direction. Additionally, movement in the direction of the "Y" arrow is designated as "up" (i.e., opposite the direction of gravity), and movement in the direction opposite the "Y" arrow is designated as "down." As such, each of the axes (i.e., x-axis, y-axis, and z-axis) are orthogonal to one another.

In certain cases, including in the embodiment illustrated in FIG. 1, the selected intersecting plane 134 may correspond to another intersecting plane 136, which may be a ground or floor surface. However, in other cases, the selected intersecting plane 134 may correspond to a ceiling or to another arbitrarily-selected plane that may be placed anywhere in the physical environment 100. The selected intersecting plane 134 may be a physical plane (i.e., one that exists in physical space) or may be non-physical (i.e., a hypothetical or imaginary plane). In each case where a selected intersecting plane 134 is provided, the first physical surface 104 and the selected intersecting plane intersect with one another along a second elongate intersection 138 and the second physical surface 106 and the selected intersecting plane intersect with one another along a third elongate intersection 140. As such, the first elongate intersection 108 is oriented in a first orientation (i.e., parallel with the Y-axis in this illustrated embodiment), the second elongate intersection 138 is oriented in a second orientation (i.e., parallel with the X-axis in this illustrated embodiment), and the third elongate intersection 140 is oriented in a third orientation (i.e., parallel with the Z-axis in this illustrated embodiment). Similarly, the virtual intersecting plane 206 of model 200 intersects with the first virtual surface 202 along a fourth elongate intersection 208 and intersects with the second virtual surface 204 along a fifth elongate intersection 210.

Using a computer-based XR generation system, the model 200 is assigned a position and orientation such that the first virtual surface 202 is co-planar with the first physical surface 104 and the second virtual surface 204 is co-planar with the second physical surface 106. As such, after aligning the virtual surfaces 202, 204 with the physical surfaces 104, 106, respectively, in this manner, an intersection point 212 of model 200, where the fourth elongate intersection 208 intersects with the fifth elongate intersection 210, is disposed along the first elongate intersection 108. As noted above, in FIG. 4, selected intersecting plane 134 may be placed, such as by the tagging procedure discussed earlier, such that it corresponds to a ground or floor surface of physical environment 100 and virtual intersecting plane 206 is co-planar with the selected intersecting plane. As such, the intersection point 212 is not only disposed along the first elongate intersection 108 of physical environment 100 but is also co-planar with the floor 136 and selected intersecting plane 134. Accordingly, this method aligns the model 200 with the physical environment 100 in the XY, YZ, and XZ planes.

Figure 5:
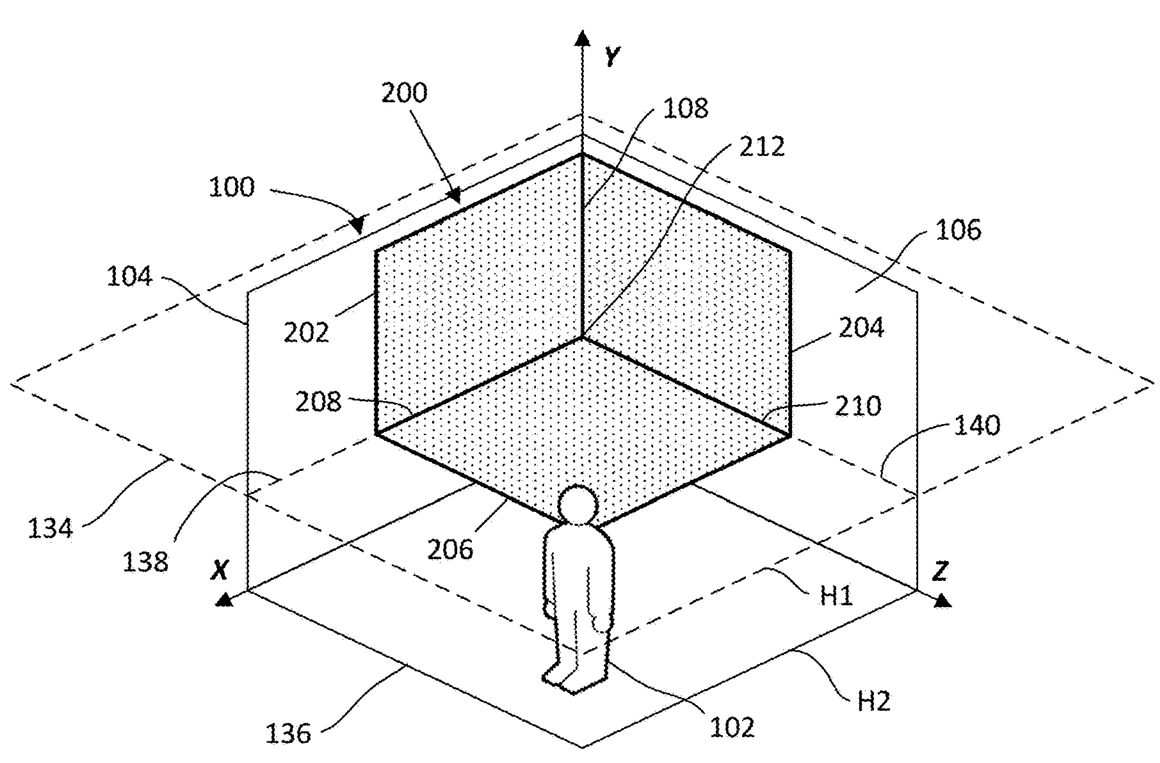
FIG. 5 depicts a physical environment that has been aligned with XR model according to an alternative method of the present invention.

However, in other embodiments, including the embodiment shown in FIG. 5, the selected intersecting plane 134 is not co-planar with the floor 136. Instead, the selected intersecting plane 134 is located at a first height H1 (measured along the Y-axis) and the floor 136 is located at a second height H2 (measured along the Y-axis) that is positioned vertically below height H1. Accordingly, in this embodiment, the selected intersecting plane 134 is located vertically above the floor 136. Thus, by following the same alignment process above, the intersection point 212 is still disposed on the first elongate intersection 108 of physical environment 100 but is not co-planar with the floor 136 at height H2; instead, the intersection point is located above the floor at height H1. Nevertheless, this method simultaneously aligns the translational and rotational positions of the model 200 with the translational and rotational positions of the physical environment 100. Thus, this method permits physical environment 100 to be aligned with model 200 at any selected vertical position, including a user-selected vertical position. Likewise, this method permits the model 200 to be aligned with the physical environment at any selected vertical position, including a user-selected vertical position.

These methods may be used in mapping or in providing a system of record for multiple coordinate systems. In this mapping process, a position and a rotation are needed to completely align or coordinate the different coordinate systems. A common position may be identified using the methods discussed above. So, a next step is to provide an orientation or rotational position. The users could seek to align coordinate systems by identifying common structures to align the rotational position of one coordinate system with the rotational position of another coordinate system. However, user-based methods or manual methods can be a source of error. It is preferable to use a method of orienting coordinate systems that does not introduce user error.

Figure 6:
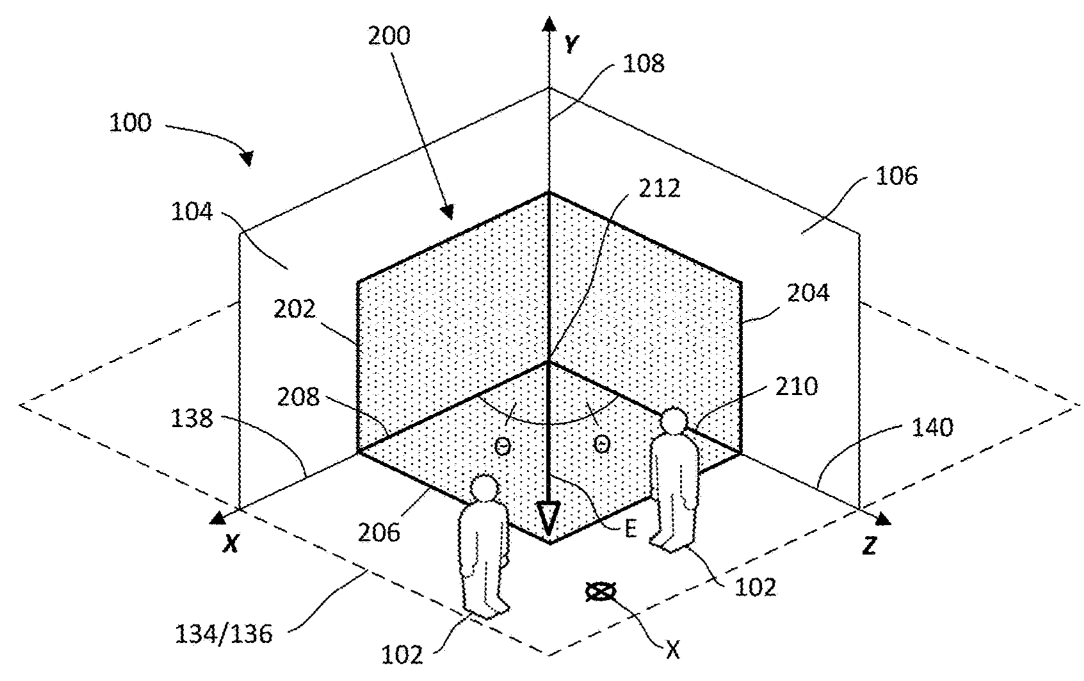
FIG. 6 depicts an alignment vector and a point of interest in an aligned physical environment and XR model according to an embodiment the present invention.

Therefore, in certain preferred embodiments and as illustrated in FIG. 6, a further step of the method is bisecting an angle formed between the first virtual surface 202 and the second virtual surface 204 to define an alignment angle Θ. Then, using the XR generation system to define an alignment vector E that is co-planar with the virtual intersecting plane 206 and that extends away from the intersection point 212 at the alignment angle Θ. Also, once the intersection point 212 has been identified, the physical environment 100 and model 200 are preferably aligned with one another for all users 102 and for all XR systems that they may be using, despite the different perspectives of those users and despite the different coordinate systems, origins, etc. used by those XR systems. Advantageously, this alignment would permit all users 102 to identify, navigate to, interact with a consistent point of interest x within both the physical environment 100 and model 200 based on the single intersection point 212 alone. While not required, the alignment vector E would assist in more quickly and reliably aligning the physical environment 100 and model 200 for the users 102.

In other cases, the alignment angle Θ may be derived using other methods, including methods that do not rely on bisection. For example, in some cases, angle Θ may be obtained by dividing or multiplying the angle formed between the first virtual surface 202 and the second virtual surface 204 by any number, including the number one. In other cases, other mathematical operations may be used on the angle formed between the first virtual surface 202 and the second virtual surface 204 to derive angle Θ, including addition, subtraction, or any other mathematical operations (e.g., addition, subtraction, identity operator, etc.).

In other embodiments, angle Θ may be derived using a "triangulation" method that relies on "key points," which may include corners or other identifiable locations within a particular space. While the term "triangulation" suggests a minimum of three points, this triangulation method does not require a minimum of three points to define angle Θ. Instead, angle Θ and, thus, an orientation may be derived using, e.g., two corners. In that case, the alignment vector E is drawn from one corner to the other and then that vector may be used to align virtual content across multiple devices and/or coordinate systems.

In other cases, the method described above may be extended to rely on "immutable" features of the space beyond mere corners. For example, the alignment vector E may be drawn between a door and a window, between a door and a corner, or between some other number (i.e., more than two) of items or locations that can be identified and that may be considered immutable (i.e., unchanging over time). In other cases, the features used for this alignment process may include detectable features or one or more collections of detectable features that have one or more of a defined location or orientation in 3D space. These features may be visually detectable and may be detected using computer vision or other similar techniques. In such cases, these features act as "visual features," "visual fiducials," "anchors," "visual artifacts," "visual cues," and similar elements known to those of skill in the art. However, in other cases, features that are not visually detectable may be used for this alignment process so long as those features remain "detectable" in some fashion. In various embodiments, suitable features that are not "visually" detectable could include any number of things located elsewhere on the electromagnetic spectrum, including radio waves, IR or other non-visible light, WiFi or Bluetooth emanations or reflections, etc. In other cases, features or elements that are detectable in other ways might be used. These might include acoustically-detectable features, radiation, particle emissions, tangible, thermally-detectable (e.g., based on temperature or temperature differentials), pressure, chemical properties (e.g., acidity), or other physical characteristics like humidity or moisture content. The examples above are given as non-limiting examples. As a person of skill in the art would understand, any feature, property, element, etc., or combinations thereof, that can be detected could be used in this alignment process.

As the term is defined herein, "immutable" means not changed over a given period. This may include permanently immutable or temporarily immutable. In the case of temporary immutability, the time may be years, days, hours, or seconds. The relevant time period may also be over the course of one "play session" or across more than one play session. At a minimum, when used in describing the alignment processes herein, "immutable" means unchanging during the alignment process. For example, although furniture may be easily moved and its position in 3D space is not permanently fixed, the location of a chair and a table may be used in this alignment process provided their respective locations in space remain fixed throughout the alignment process. In such cases, positions may be defined by mapping the locations of the immutable features in the virtual space to the location of corresponding features in the physical space. In preferred embodiments, the alignment process described above may be further optimized by ensuring a "best fit" of the features in the virtual space to those in the physical space. The identification of "immutable" features may be done manually by a user. For example, a user might manually identify the location of a door, window, corner etc. in the physical and/or virtual space that is then mapped to corresponding locations in the other of the physical or virtual space.

The method discussed above relies on the use of planes or projected surfaces (e.g., surfaces 116 and 118, shown in FIG. 2, or surfaces 128 and 130, shown in FIG. 3) to identify a specific location in the physical environment 100 that is then aligned with an intersection point 212 this is formed at an intersection of planar surfaces in an XR model, such as surface 202 and 204 (and sometimes 206) shown in FIG. 1. To identify a plane in space, a minimum of three points or locations must be identified. Therefore, in the XR model 200, at least three points must be identified for each of the surfaces 202, 204, 206. As previously noted, these points in space can be chosen by any method, including current tagging/anchoring methodologies (e.g., QR codes, visual tracking, controller position).

Figure 7:
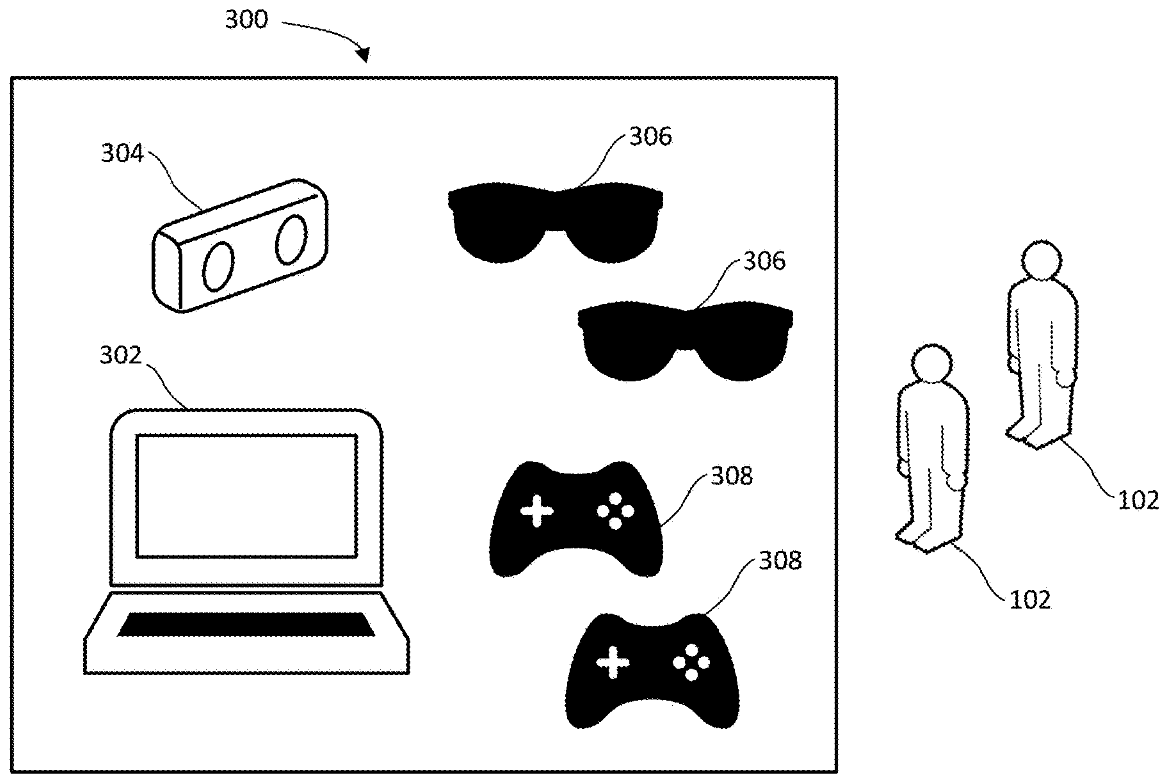
FIG. 7 depicts an XR generation system that may be used in aligning a physical environment with an XR model using methods of the present invention.

For example, FIG. 7, shows a simplified example of an XR generation system 300 that may be used according to the methods described herein to align XR content with a physical environment and for enabling users 102 to interact with that that XR content and with each other while located within the physical environment. As shown, the system 300 may include one or more computer systems 302 used for generating XR content. The computer system 302 may be configured to work cooperatively with a positional sensor 304, including accompanying software, using time of flight (ToF) or other methods to identify points in the physical environment that are then used to identify the surfaces discussed above. Positional sensor 304 may include any device that can provide, within a degree of certainty, a three-dimensional location and, preferably, orientation of a point in space. This can be carried out using image sensing, time of flight, or other positional sensing methods. For example, electromagnetic methods, Wi-Fi, GPS, acoustic, and other methods may be used to detect a 3D position of a point in space. Additionally, system 300 may include input-output (I/O) components for interacting with the XR content. The I/O components preferably includes one or more output devices 306, which are illustrated in this case as XR goggles but that may include other similar output devices (e.g., screens, headsets with displays, etc.) to display XR content generated by the computer systems 302. Additionally, the I/O components preferably include one or more input devices 308, which are illustrated in this case as game controllers but that may include other similar input devices (e.g., microphones, keyboard, computer mouse, XR handset, or other XR peripherals, etc.) to receive any form of input from the users 102.

In other embodiments, a different method used to align XR content with a physical environment may rely on the use of lines instead of surfaces. To define a line, only a pair of points must be identified. Therefore, as explained below, this alternative method merely requires two points to be identified for each line defined and does not require three points to define a surface as in the prior methods.

Figure 8:
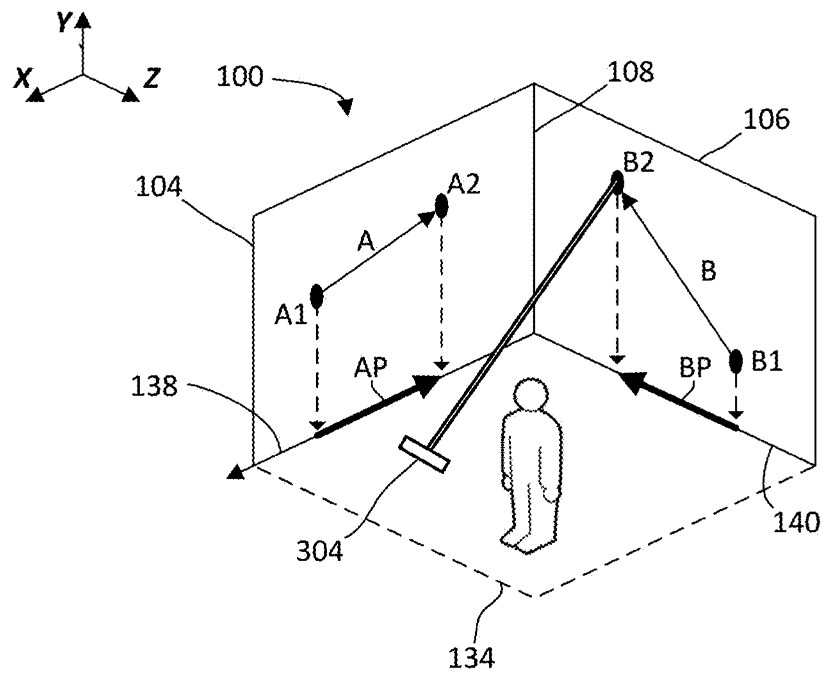
FIG. 8 depicts a physical environment and XR content that are being aligned according to a method of the present invention.
Figure 9:
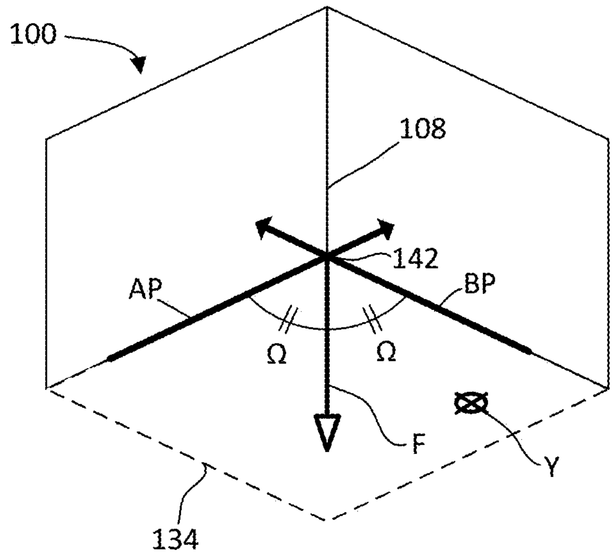
FIG. 9 depicts an alignment vector and a point of interest in an aligned physical environment and XR model according to an alternative embodiment the present invention.

Now, with reference to FIGS. 8 and 9, physical environment 100 is similar to that from FIG. 1. As before, an arbitrary Cartesian coordinate system may be defined, which system includes an X-axis, Y-axis, and Z-axis that define an XY plane, a YZ plane, and an XZ plane. The physical environment 100 includes a first physical surface 104 that is parallel with the XY plane and a second physical surface 106 that is parallel with the YZ plane and that intersects the first physical surface along a first elongate intersection 108. As before, in certain cases, the intersecting surfaces may not intersect or may not provide a clear "intersection" between them. In those cases, projected surfaces may be used in place of the actual surfaces to define the first and second physical surfaces 104, 106 in order to provide the elongate intersection 108. Then, a selected intersecting plane 134 is defined as intersecting with the first physical plane 104 along a second elongate intersection 138 and as intersecting the second physical plane 106 along a third elongate intersection 140. In some cases, including the illustrated embodiment, the selected intersecting plane 134 is parallel with the XZ plane. However, in other cases, the selected intersecting plane 134 is not parallel with the XZ plane. As detailed below, in this embodiment, a first set of the points defines a first line, and a second set of points defines a second line and those two lines are used to define a unique intersection point that is then aligned with the first elongate intersection 108 in order to align the physical environment 100 with the XR content.

Using an XR generation system, such as system 300 (FIG. 7), points A1 and A2 may be defined as being co-planar with the first physical surface 104 and points B1 and B2 may be defined as being co-planar with the second physical surface 106. These points may be recorded using a positional sensing device, such as the depth-sensing device 304 shown in FIG. 7. In certain embodiments, the XR generation system may be configured to automatically define one of the pair of points. For example, in certain cases, if a user records point A1 or point A2, the other point may be automatically defined by the XR system. Similarly, if a user records point B1 or point B2, the other point may be automatically defined by the XR system. During this auto-recording step, the XR generation system may be configured to detect the relevant physical surface and to automatically record the second point at a pre-defined distance away from the first point on the selected physical surface. In other embodiments, the XR system is configured to auto-sample the environment and to automatically detect all points without requiring user involvement or with minimal user involvement, e.g., a confirmation step where the user confirms that eth selected points should be used in carrying out the alignment process.

As depicted, in this embodiment, the first physical surface 104 and the second physical surface 106 each form a plane. Using the XR generation system, a line is passed through points A1 and A2 to define line A that is co-planar with first physical surface 104 and a second virtual line is passed through points B1 and B2 to define line B that is co-planar with the second physical surface 106. Next, line A and line B are each projected onto the selected intersecting plane 134 to provide line segment AP and line segment BP, respectively. Then, an intersection point 142 is defined where line AP and line BP intersect with one another. As may be seen by comparing FIGS. 8 and 9, in certain embodiments, it may be necessary to extend line AP, line BP, or both to cause them to intersect with one another. The intersection point 142 of the two line segments AP and BP now defines a unique position in space that is analytically determined. Once the intersection point between lines AP and BP has been identified, that unique intersection point 142 is aligned co-linearly with the first elongate intersection 108. Then, at that point, the intersection point 142 may be used to align XR content provided by the XR generation system with the physical environment 100.

As before, a further step of the method is bisecting an angle formed between line segment AP and line segment BP to define an alignment angle Ω. The XR generation system may then be used to define an alignment vector F that is co-planar with selected intersecting plane 134 and extends away from the intersection point 142 at the alignment angle Ω. The alignment vector F provides a consistent direction for all users and for all the XR systems that they may each be using, despite the different perspectives of those users and despite the different coordinate systems, origins, etc. used by those XR systems. Similarly, intersection point P provides a consistent position for all users. Advantageously, this alignment vector F and intersection point P, in combination, provide a unique orientation and position that uses only the physical walls as fiducials and permits the users to align all coordinate systems to a common point of interest Y.

Using the methods discussed above, since the points can be tagged using positional sensors, rather than computer vision or position systems such as SLAM, the total uncertainty is reduced to only the intrinsics (systematic and statistical) of the positional sensors (or other surface detection). Further, even human error is eliminated using these methods because the location of the points on the walls are immaterial and simple mathematical tests can determine if the points are, in fact, on either side of intersecting planes. If no intersection is calculated from the projected line segments, the user can be alerted that they have selected points inappropriately and may then be forced to do it again. Next, even the order of tagging points does not matter because depth-sensing/surface detection can successfully determine which two points belong in each set of points based on inferred surface normal. As discussed above, the second point of each set of points can be automatically determined if basic assumptions on distance can be made. For example, if one assumes that all walls have at least a minimum length (e.g., 10 cm or 1 mm), then the XR system can automatically select a second point that is within some presumed distance from the first point selected. In those cases, therefore, the user would only need to select 2 points rather than selecting 4 points.

Figures 10, 11:
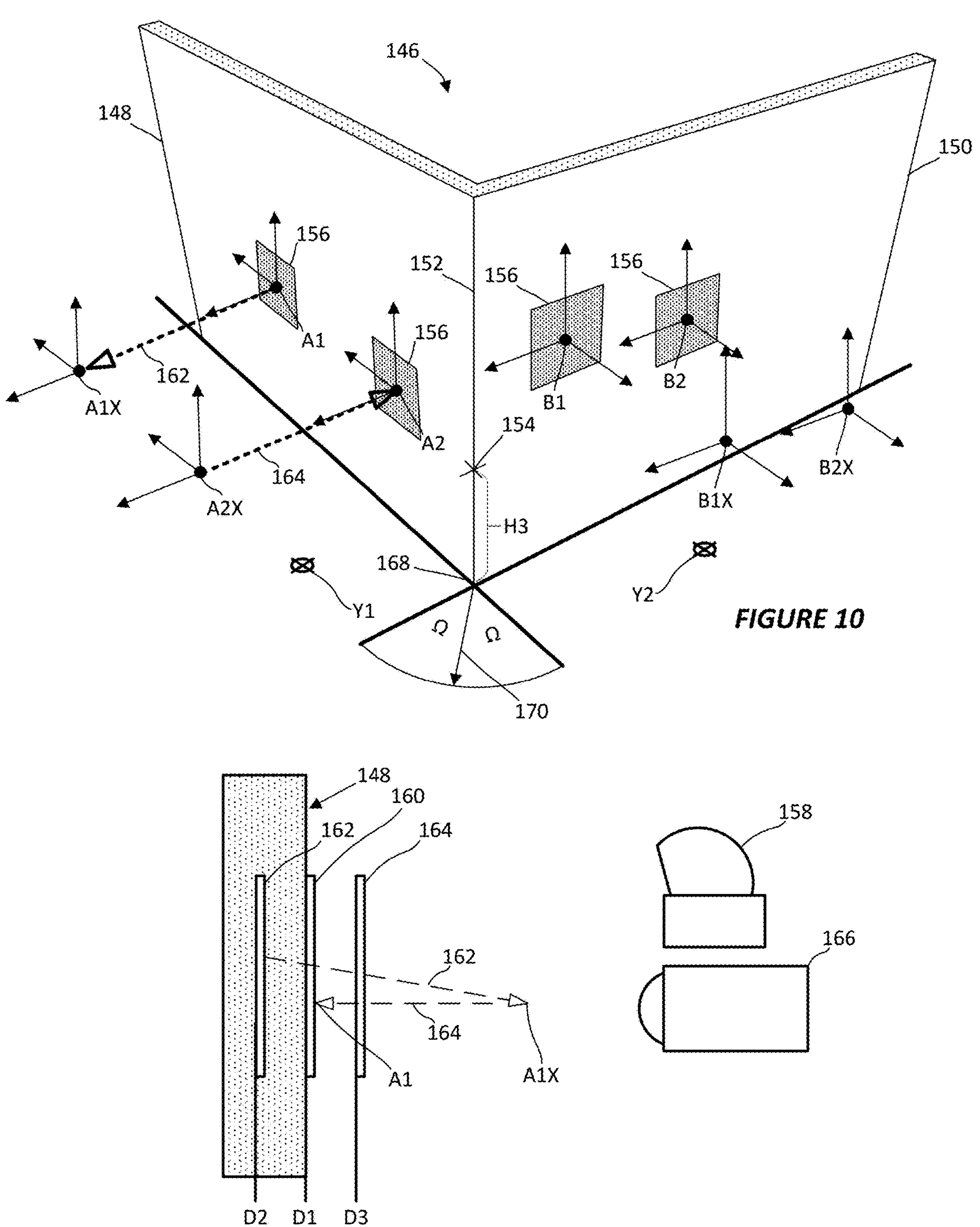
FIG. 10 depicts a physical environment and four QR images in use to provide an intersection point according to an embodiment of the present invention.
FIG. 11 depicts an image sensor and a positional sensor being used to carrying out a depth verification step according to an embodiment of the present invention.

The present disclosure describes various methods that can be used to locate and record various points in space. With reference to FIGS. 10 and 11, a physical environment 146 is shown that has a first wall 148 that intersects with a second wall 150 along an intersection 152. Using the methods described above, an intersection point 154 may be defined in a virtual model as being aligned (i.e., co-linear) with and positioned at a height H3 relative to intersection 152. By locating intersection point 154 relative to the physical environment 146, other points of interest in the virtual model may also be located in that same environment. For example, points of interest Y1 and Y2, which may each represent a virtual avatar's position or user position, where each of the points of interest may have a unique coordinate system. Advantageously, the methods described allow for these points of interest Y1, Y2 and their respective coordinate systems to be aligned and correctly represented, positioned and moved with respect to the other points of interest and coordinate systems.

In the illustrated embodiment, images (e.g., QR codes) 156, which are placed on each of the walls 148, 150, may be imaged by an imaging device 158 such as a camera on a headset or other connected device. Capturing these images 156 provides a rough position of the points on the walls (e.g., A1, A2, B1, and B2). The precise position and orientation of the QR code (or other image to be detected) is not critical in selecting, detecting, or placing points, as described above, in implementing the methods. However, it is important to ensure that related points on each wall (e.g., A1 and A2 or B1 and B2) lie on the same plane. Again, while their relative position on that plane is not particularly critical, ensuring that each point has the same "depth" is important.

For example, as depicted in FIG. 11, if imaging one of the QR codes identifies a point 160 that is recorded as located on the outside surface of a wall 148 (i.e., at depth D1), it is important that other points are not recorded as located within the wall (like point 162 at depth D2) or located outside of the wall (like point 164 at depth D3). This is a dominant and, perhaps, the most critical factor in accurately and successfully carrying out the methods described above. As such, in certain embodiments of the method, a depth verification step can be used to verify the depth of each related point used in this method and to ensure that each lies on the same plane when using image detection.

To conduct this check, an imaging device 158 is first used to detect and record the rough position of each the points/images. Using an XR system, a ray 162 is cast forward from the detected point A1X to a location in space. In this case, "forward" may be defined as normal to QR code/image and is based on the orientation of the QR code/image. Again, the precise orientation of the image is immaterial to this method and the "forward" direction does not need to be normal to the physical surface (e.g., wall 148) on which the image is placed. This projected point A1X is preferably projected outwards by some reasonable distance (e.g., 1 m) that is greater than some multiple of the image sensor's uncertainty in detecting the location of the wall surface. Similar points A2X, B1X, and B2X are shown for each of the other images 156. In each case, from the projected point, a ray 164 is cast backwards towards the wall surface using a positional sensor 166 as a re-projected point A1. Similar points A2, B1, and B2 may also be provided. In each case, the depth where this re-projected point is located with respect to the wall 148 is detected by sensor 166 and is recorded as the actual location (i.e., depth) of the point. The points A1, A2, B1, and B2 may be used according to the methods described above to locate and define an intersection point 168 that is co-linear with intersection 152, including by using intersecting lines or by using intersecting planes. Likewise, an alignment vector 170 may be defined using the methods described above. Using the intersection point 168 and, optionally, the alignment vector 170, users can define the position and orientation of various points of interest (e.g., Y1 and Y2), including points of interest that are each associated with a unique coordinate system that is different from the coordinate system of other points of interest, the environment, and the model.

Figure 12:
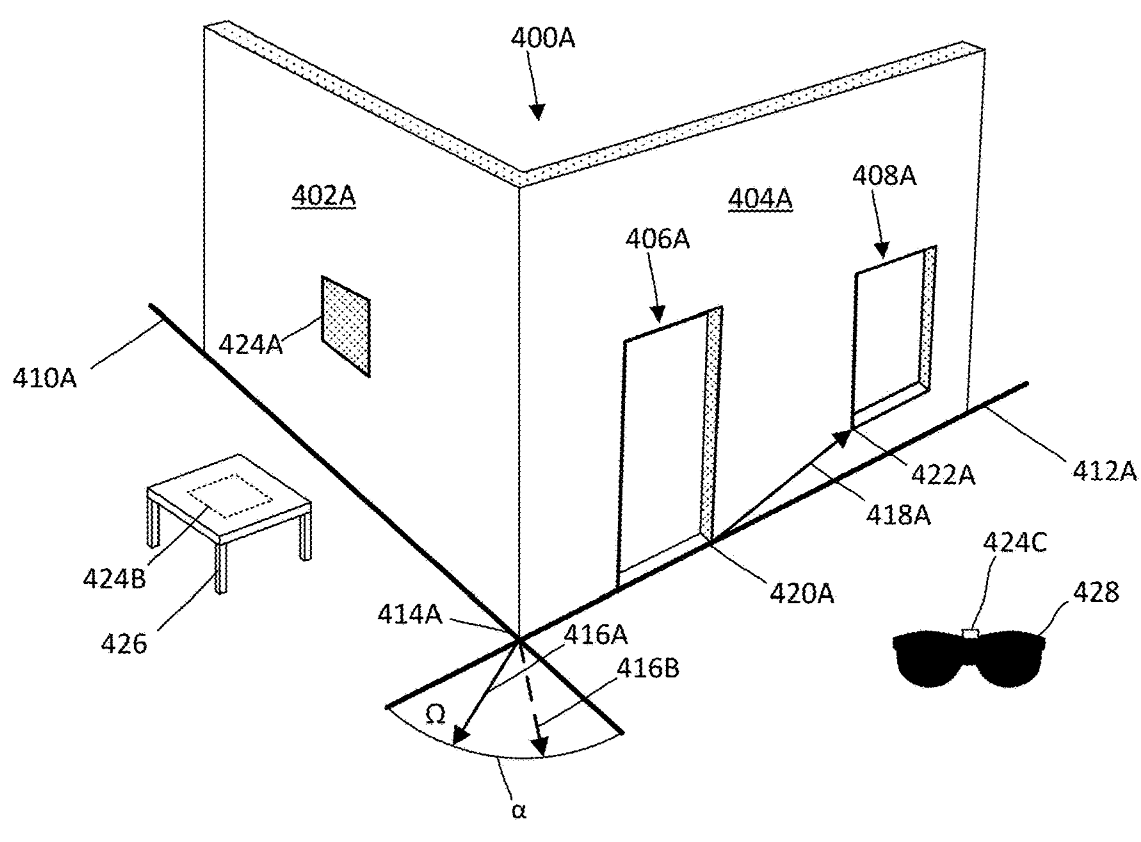
FIG. 12 depicts a physical environment and a virtual environment that each include a pair of immutable features and locator devices that may be used to align the environments and that may be used to pair one system or coordinates with another system of coordinates according to an embodiment of the present invention.
Figure 12:
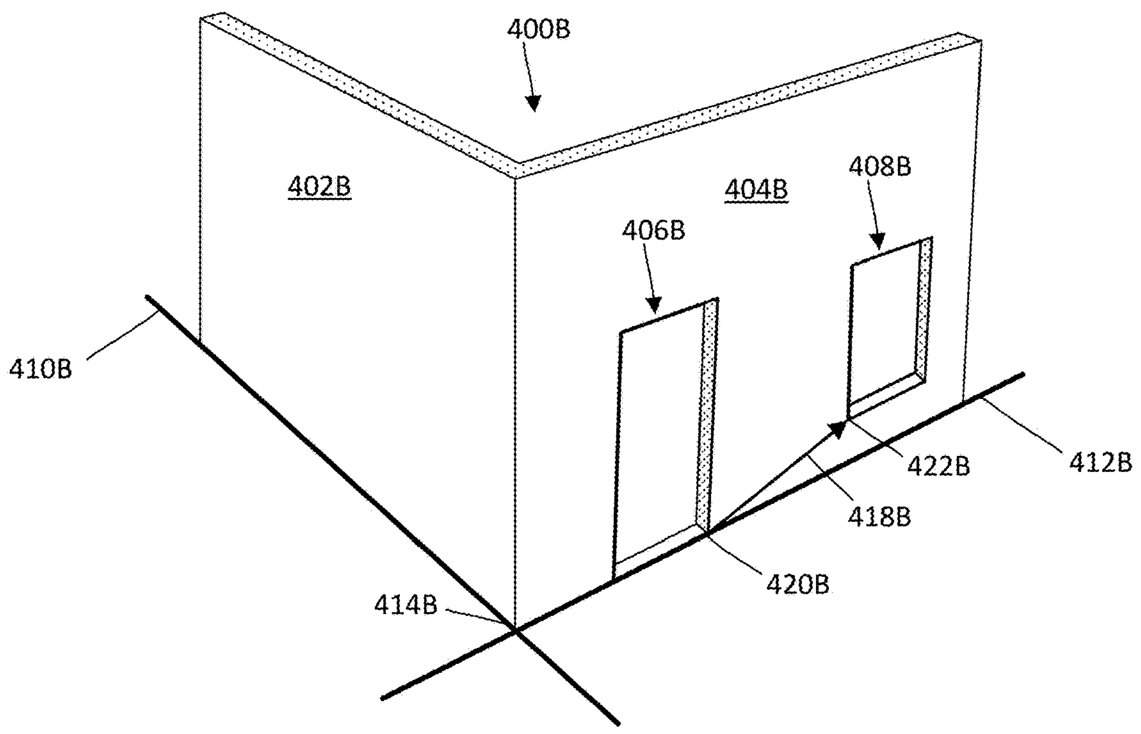

As noted previously, a system's coordinate system might not be absolute. While a system might know where it is locally, it may not have any reference for where it is with respect to other systems. This issue may apply not only to environments but also to hardware or peripherals. Thus, there is a need for, when pairing multiple systems, guaranteeing that each environment and each piece of hardware references a common coordinate system and is aligned and positioned correctly with respect to other environments and hardware. In FIG. 12, examples for aligning multiple environments and/or multiple coordinate systems are provided.

As illustrated, a first environment 400A and a second environment 400B are shown. First environment 400A includes certain immutable features, such as first wall 402A, second wall 404A, door 406A, and window 408A. A first line 410A is parallel and co-planar with the first wall 402A and a second line 412A is parallel and co-planar with the second wall 404A. The first line 410A and the second line 412A intersect an intersection point 414A and an angle α is created between those two lines. In this embodiment, to define an alignment vector, the angle α is divided evenly into three sections and an alignment vector 416A having an angle Θ is oriented along an intersection between two of these three equal sections. In this embodiment, angle Q is defined relative to second line 412A. However, angle Ω2 could, of course, be defined relative to first line 410A (see line 416B). Also, as discussed above, instead of division, other mathematical operations may be used to modify and derive the angle formed between the intersection of lines 410A, 412A in defining the alignment angle(s) of the alignment vectors.

In a second case, an alignment vector may be derived using other immutable features. For example, alignment vector 418A is defined as a line extending from a first point 420A located at a bottom right corner of door 406A and extending upward and rightwards to a second point 422A located at a bottom left corner of window 408A. In this case, the points of interest (i.e., first point 420A and second point 422A) used to generate the alignment vector 418A are in certain specific locations with respect to two immutable features. However, other alignment vectors may be defined using points of interest at other locations on those same immutable features, with different immutable features, or even with a single immutable feature. For example, one point of interest may be located at a bottom right corner of window 408A and a second point of interest may be located at a top left corner of that same window.

Similarly, a second environment 400B is shown and preferably also includes immutable features that can be matched to the immutable features of the first environment 400A. Second environment 400B includes a first wall 402B, second wall 404B, door 406B, and window 408B. A first line 410B is parallel and co-planar with the first wall 402B and a second line 412B is parallel and co-planar with the second wall 404B, and the two lines intersect one another at an intersection point 414B.

Either of these environments 400A, 400B may be a physical environment or a virtual environment. Additionally, while environments 400A, 400B are represented here as being identical in structure, the two environments can be structurally different, including with different layouts, contents, structures, features, etc. Also, in certain embodiments, the immutable features of the two environments 400A, 400B do not need to match identically, so long as immutable features in each environment can be matched to one another. For example, a door in one environment (e.g., physical environment) could be matched to a window in a different environment (e.g., virtual environment).

The two environments can be matched or coordinated by mapping or cross-referencing the locations of the immutable features of one environment to the other environment. Then, the two environments may be aligned using the alignment vector. Once points of interest and alignment vectors are identified in one environment (e.g., first environment 400A), they may then be used to align that first environment with a second environment (e.g., second environment 400B). For matching the position of the two environments 400A, 400B, points of interest in one environment (e.g., immutable features) are mapped to corresponding points of interest in the second environment. For example, the position of points 420A and 422A may be matched to corresponding points 420B and 422B. Alternatively, points along lines 410A and 412A, which may include intersection point 414A, may be matched to equivalent points along lines 410B and 412B, which may include intersection point 414B. Then, to ensure that each environment is oriented correctly, the orientation of the alignment vector 418A in environment 400A may be matched to the orientation of a corresponding alignment vector 418B that extends between door 406B and window 408B.

In preferred embodiments, the alignment process described above may be further optimized by ensuring a "best fit" of the features in one environment to those in the other environment. This is most relevant when, points of interest in one environment could be matched to two or sets of points of interest in the other environment. Identifying a "best fit" might involve, for instance, identifying the arrangement that matches the most points of interest in the two environments or where the "difference" between the matches is minimized. Next, the identification of "immutable" features may be done manually by a user. For example, a user might manually identify the location of a door, window, corner etc. in the physical and/or virtual space that is then mapped to corresponding locations in the other of the physical or virtual space. In other cases, the immutable features are identified automatically, such as by using artificial intelligence to recognize walls, doors, windows, etc.

Next, when pairing multiple systems together, an environment may provide certain features that ensure that each piece of hardware references a common coordinate system and is aligned. For example, in FIG. 12, a pair of locator devices 424, including scannable locator device 424A and interactable locator device 424B, are provided. In this case, locator device 424A is a QR code placed on wall 402. This QR code 424A provides an initial point of reference that each piece of hardware (i.e., XR peripheral) used in the physical environment may be required to scan or image (e.g., with a camera). In certain embodiments, this process may occur at certain pre-defined times, such as during an initialization step. Scanning this QR 424A code could then be used by the device to reference all other coordinates for that physical environment. Another option is to provide a designated locator position where hardware is placed to be aligned and located within an environment. In the illustrated embodiment, interactable locator device 424B is an alignment mat that is placed at a fixed location (e.g., table 426). Preferably, each piece of hardware is placed at the designated locator position in a consistent orientation to enable the position and orientation to be coordinated automatically across all devices. For example, in certain embodiments, the interactable locator device 424B requires a specific orientation, such as by providing a custom-made cutout that receives the piece of hardware.

Another option for pairing multiple systems together is to provide locator devices in the form of one or more sensors 424C that are attached to each piece of hardware, where the sensors are all calibrated to the environment. For example, sensor 424C may include a calibrated magnetometer or other similarly calibrated sensor that is attached to each piece of hardware. This sensor 424C would preferably be capable of determining and then tracking one or more of a location and orientation in space including, for example, by determining where "magnetic North" is located, which should be consistent across all devices. In other cases, if not consistent across all devices, the different locations should be capable of being tracked and transformed from one device to another. For example, in one device having a first coordinate system, "magnetic North" may be located at "zero degrees," while "magnetic North" in a second device having a second coordinate system may be located at "150 degrees." In such cases, so long as the position and orientation of these devices and their respective coordinate systems can be tracked and coordinates from one coordinate system may be transformed to coordinates in the other coordinate system, the sensors may be used for pairing and tracking. This would, in turn, allow the sensors 424C to track movement of the various pieces of hardware across multiple systems. These sensors 424C do not need to be included by the hardware manufacturer. Instead, for this purpose, one or more low-cost, low-energy aftermarket sensors (e.g., Bluetooth) sensors 424C can be attached to the hardware (e.g., headset 428) at certain locations. Of course, the sensors 426C can be built directly into the hardware. In that case, API access would not be required. Finally, in certain cases, computer vision can be used to detect position and orientation of hardware within each environment and then, using that data, the location and orientation of the hardware within the environment can be determined.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A method for delivering extended reality (XR) content comprising:

providing a physical environment having a physical entity, a first physical surface and a second physical surface;

providing a first projected surface that is co-planar with the first physical surface and a second projected surface that is co-planar with the second physical surface, wherein the first projected surface intersects with the second projected surface along a first elongate intersection;

providing an XR system comprising an XR content generation system (XGS) for generating the XR content and input-output (I/O) components including an input device for receiving inputs for interacting with the XR content and an output device for outputting the XR content including at least visual XR content;

with the XGS, generating a XR environment having an XR entity that corresponds to the physical entity, a first XR surface, a second XR surface, and a XR intersecting plane, wherein the XR environment may be traversed by receiving the inputs via the input device;

aligning the XR environment with the physical environment via an alignment process such that a physical location in three-dimensional physical space, and movement of the physical entity within the physical environment is identically aligned and identically mirrored by a corresponding XR location in three-dimensional XR space, and corresponding movement of the XR entity within the XR environment, the alignment process including assigning a location to the XR environment with respect to the physical environment such that:

the first XR surface is co-planar with the first physical surface;

the second XR surface is co-planar with the second physical surface;

the XR intersecting plane intersects with the first XR surface along a fourth elongate intersection and intersects with the second XR surface along a fifth elongate intersection; and an intersection point is located at an intersection of the fourth elongate intersection with the fifth elongate intersection, such that the intersection point is disposed along the first elongate intersection;

defining a first alignment vector in the physical environment relative to a selected location in the physical environment; defining a second alignment vector in the XR environment relative to a selected location in the XR environment; and aligning the XR environment with the physical environment by aligning the first alignment vector with the second alignment vector.

2. The method of claim 1 further comprising aligning the XR environment with the physical environment such that a physical position, including the physical location and an orientation in the three-dimensional physical space, is identically aligned and identically mirrored by a corresponding XR position, including the XR location and an orientation in the three-dimensional XR space, the alignment process further including assigning a position, including said XR location and an orientation, to the XR environment with respect to the physical environment.

3. The method of claim 1 further comprising:

when the physical entity is in a first physical position, using the output device, outputting visual XR content where the XR entity is located at a corresponding first XR position;

with the input device, receiving an input corresponding to a change in position of the physical entity in the physical environment from the first physical position to a second and different physical position; and in response to the change of position of the physical entity, with the output device, outputting visual XR content where the XR entity is located at a corresponding second XR position.

4. The method of claim 3 further comprising, with the output device, outputting visual XR content that identically mirrors movement of the XR entity from the first XR position to the second XR position in the XR environment that identically mirrors movement of the physical entity from the first physical position to the second physical position in the physical environment.

5. The method of claim 1 wherein each of the first alignment vector and the second alignment vector has an alignment angle and wherein the alignment angle of the first alignment vector is defined based on an angle formed between the first physical surface and the second physical surface or wherein the alignment angle of the second alignment vector is defined based on an angle formed between the first XR surface and the second XR surface.

6. The method of claim 5 further comprising:

in defining the first alignment vector, performing a mathematical operation on the angle formed between the first physical surface and the second physical surface; or in defining the second alignment vector, performing a mathematical operation on the angle formed between the first XR surface and the second XR surface.

7. The method of claim 1 wherein the first alignment vector extends between a pair of immutable features in the physical environment or wherein the second alignment vector extends between a pair of immutable features in the XR environment.

8. The method of claim 1 wherein the XR system includes an XR peripheral and a locator device configured to locate and to track a position and movement of the XR peripheral in the physical environment, the method further including establishing a linkage between the XR peripheral and the locator device to establish an initial position of the XR peripheral within the physical environment; and, using the locator device and while the linkage is established, tracking changes in a position of the XR peripheral in the three-dimensional physical space.

9. The method of claim 8 wherein, in establishing the linkage between the XR peripheral and the locator device, the locator device is imaged.

10. The method of claim 8 wherein, in establishing the linkage between the XR peripheral and the locator device, the locator device is contacted by the XR peripheral.

11. The method of claim 1 wherein the XR system includes at least two I/O components and a calibrated sensor associated with one of the at least two I/O components, wherein the calibrated sensor is configured to sense tracked information comprising at least one of location, orientation, or movement of the one of the at least two I/O components, the method further comprising using the calibrated sensor to sense the tracked information of the one of the at least two I/O components and making the tracked information available to another one of the at least two I/O components.

12. The method of claim 11 wherein a separate calibrated sensor is associated with each of the at least two I/O components, the method comprising using each calibrated sensor to sense tracked information of an associated I/O component and then making the tracked information of the associated I/O component available to another one of the at least two I/O components.

13. The method of claim 11 wherein the calibrated sensor is configured to sense tracked information comprising each of the location, the orientation, and the movement of the one of the at least two I/O components.

14. The method of claim 11 wherein the calibrated sensor comprises a magnetometer.

15. An alignment method for extended reality (XR) content comprising:

providing a first environment and a second environment, each having a first surface and a second surface;

in each of the first environment and the second environment, defining intersection points;

defining at least one of the intersection points by:

providing a first line A that is coplanar with the first surface and a second line B that is coplanar with the second surface;

providing an intersecting plane that intersects the first surface and the second surface;

projecting line A onto the intersecting plane to provide projected line segment AP and projecting line B onto the intersecting plane to provide projected line segment BP, wherein the line segment AP and the line segment BP are sized and configured to intersect with one another at the at least one of the intersection points;

aligning a position of the first environment with a position of the second environment via an alignment process comprising aligning the intersection points, wherein one environment of the first environment and the second environment is a XR environment comprising the XR content generated by an XR content generation system (XGS) and wherein another environment of the first environment or the second environment is a physical environment.

16. The method of claim 15, wherein, in at least one of the first environment and the second environment, providing points A1 and A2 that each has a location defined as co-planar with the first surface and providing points B1 and B2 that each has a location defined as co-planar with the second surface, wherein line A passes through the points A1 and A2 and line B passes through the points B1 and B2.

17. The method of claim 16 wherein at least one of the points A1, A2, B1, B2 is provided by selecting a portion of the first surface or the second surface of the at least one of the first environment and the second environment in order to specify a location of the at least one of the points A1, A2, B1, B2.

18. The method of claim 17 further comprising, using the XGS, automatically selecting the at least one of the points A1, A2, B1, B2 in response to the at least one of the points A1, A2, B1, B2 being selected.

19. The method of claim 15 further comprising:

providing an alignment vector in each of the first environment and the second environment, wherein each alignment vector has an alignment angle measured relative to either the first surface or the second surface; and aligning an orientation of the first environment with an orientation of the second environment by aligning the alignment vectors.

20. The method of claim 15 wherein the line segment AP and the line segment BP, when not extended, do not intersect one another, the method further comprising extending at least one of the line segment AP and the line segment BP in order to provide the intersection.

21. The method of claim 15 wherein:

said one environment further includes a three-dimensional XR environment having an XR entity;

said other environment further includes a three-dimensional physical environment having a physical entity that corresponds to the XR entity; and the XGS comprising an input device for receiving inputs for interacting with the XR content, and an output device for outputting the XR content including at least visual XR content;

the method further comprising:

after the position of the first environment is aligned with the position of the second environment, when the physical entity is in a first physical position, using the output device, outputting visual XR content where the XR entity is located at a corresponding first XR position;

after the position of the first environment is aligned with the position of the second environment, with the input device, receiving an input corresponding to a change in position of the physical entity in the three-dimensional physical environment from the first physical position to a second and different physical position; and after the position of the first environment is aligned with the position of the second environment, in response to the change of position of the physical entity, with the output device, outputting visual XR content where the XR entity is located at a corresponding second XR position.

22. The method of claim 21 further comprising, after the position of the first environment is aligned with the position of the second environment, with the output device, outputting visual XR content that identically mirrors movement of the XR entity from the first XR position to the second XR position in the three-dimensional XR environment that identically mirrors movement of the physical entity from the first physical position to the second physical position in the three-dimensional physical environment.

23. The method of claim 15 wherein the first environment and the second environment each further comprise an intersecting plane that intersects the first surface and the second surface, the method further comprising placing the first environment at a selected height with respect to the second environment by separating the intersecting plane of the first environment at a selected height H with respect to the intersecting plane of the second environment.

24. The method of claim 15 wherein the XR system includes at least two I/O components and a calibrated sensor associated with one of the least two I/O components, wherein the calibrated sensor is configured to sense tracked information comprising at least one of location, orientation, or movement of the one of the at least two I/O components, the method further comprising using the calibrated sensor to sense the tracked information of the one of the at least two I/O components and making the tracked information available to another one of the at least two I/O components.

25. The method of claim 24 wherein a separate calibrated sensor is associated with each of the at least two I/O components, the method comprising using each calibrated sensor to sense tracked information of an associated I/O component and then making the tracked information of the associated I/O component available to another one of the at least two I/O components.

26. The method of claim 24 wherein the calibrated sensor is configured to sense tracked information comprising each of the location, the orientation, and the movement of the one of the at least two I/O components.

27. The method of claim 24 wherein the calibrated sensor comprises a magnetometer.

28. A method for delivering extended reality (XR) content comprising:

providing a physical environment having a physical entity, a first physical surface and a second physical surface;

providing a first projected surface that is co-planar with the first physical surface and a second projected surface that is co-planar with the second physical surface, wherein the first projected surface intersects with the second projected surface along a first elongate intersection;

providing an XR system comprising an XR content generation system (XGS) for generating the XR content and input-output (I/O) components including an input device for receiving inputs for interacting with the XR content and an output device for outputting the XR content including at least visual XR content;

with the XGS, generating a XR environment having an XR entity that corresponds to the physical entity, a first XR surface, a second XR surface, and a XR intersecting plane, wherein the XR environment may be traversed by receiving the inputs via the input device;

aligning the XR environment with the physical environment via an alignment process such that a physical location in three-dimensional physical space, and movement of the physical entity within the physical environment is identically aligned and identically mirrored by a corresponding XR location in three-dimensional XR space, and corresponding movement of the XR entity within the XR environment, the alignment process including assigning a location to the XR environment with respect to the physical environment such that:

the first XR surface is co-planar with the first physical surface;

the second XR surface is co-planar with the second physical surface;

the XR intersecting plane intersects with the first XR surface along a fourth elongate intersection and intersects with the second XR surface along a fifth elongate intersection; and an intersection point is located at an intersection of the fourth elongate intersection with the fifth elongate intersection, such that the intersection point is disposed along the first elongate intersection;

providing a selected intersecting plane that intersects the first physical surface along a second elongate intersection and that intersects the second physical surface along a third elongate intersection, the alignment process further comprising assigning a position to the intersection point at a selected height with respect to the physical environment by positioning the XR intersecting plane at the selected height relative to the selected intersecting plane.

* * * * *